(12) United States Patent
Chiffey et al.

(10) Patent No.: US 11,484,836 B2
(45) Date of Patent: Nov. 1, 2022

(54) EXHAUST SYSTEM COMPRISING $NO_x$ STORAGE CATALYST AND CSF

(75) Inventors: Andrew Francis Chiffey, Ware (GB); Gavin Michael Brown, Essex (GB)

(73) Assignee: Johnson Matthey Public Limited Company, London (GB)

( * ) Notice: Subject to any disclaimer, the term of this patent is extended or adjusted under 35 U.S.C. 154(b) by 1593 days.

(21) Appl. No.: 13/042,960

(22) Filed: Mar. 8, 2011

(65) Prior Publication Data

US 2011/0214412 A1 Sep. 8, 2011

(30) Foreign Application Priority Data

Mar. 8, 2010 (GB) ..................... 1003781

(51) Int. Cl.
*F01N 3/00* (2006.01)
*B01D 53/94* (2006.01)
*F01N 3/035* (2006.01)
*F01N 3/08* (2006.01)

(52) U.S. Cl.
CPC ......... *B01D 53/9454* (2013.01); *F01N 3/035* (2013.01); *F01N 3/0814* (2013.01); *F01N 3/0821* (2013.01); *F01N 3/0842* (2013.01); *F01N 2370/02* (2013.01); *Y02A 50/20* (2018.01); *Y02T 10/12* (2013.01)

(58) Field of Classification Search
CPC ... B01D 53/9454; F01N 3/035; F01N 3/0814; F01N 3/0821; F01N 3/0842; F01N 2370/02; Y02T 10/22; B01J 23/44; B01J 23/42

USPC ................. 60/295, 286, 299; 422/180, 177
See application file for complete search history.

(56) References Cited

U.S. PATENT DOCUMENTS

| | | | |
|---|---|---|---|
| 8,057,768 B2 | 11/2011 | Schnieder et al. | |
| 8,211,392 B2 | 7/2012 | Grubert et al. | |
| 8,252,258 B2 | 8/2012 | Mueller-Stach et al. | |
| 8,524,182 B2* | 9/2013 | Grubert et al. | 423/213.2 |
| 9,440,192 B2 | 9/2016 | Hoke et al. | |
| 2003/0108465 A1* | 6/2003 | Voss | B01D 53/9454 |
| | | | 423/213.2 |
| 2004/0052699 A1 | 3/2004 | Molinier et al. | |
| 2006/0153761 A1* | 7/2006 | Bandl-Konrad | B01D 53/9431 |
| | | | 423/239.1 |
| 2007/0224093 A1 | 9/2007 | Miyairi et al. | |

(Continued)

FOREIGN PATENT DOCUMENTS

| | | |
|---|---|---|
| CN | 101600858 A | 12/2009 |
| EP | 0560991 | 9/1993 |

(Continued)

OTHER PUBLICATIONS

German Search Report dated Oct. 17, 2012 for corresponding German Application No. 102011005258.5 filed Mar. 8, 2011.

(Continued)

*Primary Examiner* — Matthew T Largi

(57) ABSTRACT

An exhaust gas aftertreatment system for a diesel-engined vehicle, which system comprising a $NO_x$ Storage Catalyst (NSC) followed in a downstream direction by a Catalysed Soot Filter (CSF), wherein the CSF comprises an oxidative catalyst comprising a palladium-rich weight ratio of platinum and palladium.

10 Claims, 2 Drawing Sheets

(56) References Cited

U.S. PATENT DOCUMENTS

| | | | |
|---|---|---|---|
| 2008/0127638 A1 | 6/2008 | Vaarkamp et al. | |
| 2009/0193796 A1 | 8/2009 | Wei et al. | |
| 2010/0180581 A1* | 7/2010 | Grubert et al. | 60/297 |
| 2010/0180582 A1 | 7/2010 | Mueller-Stach et al. | |
| 2010/0183490 A1 | 7/2010 | Hoke et al. | |
| 2010/0186375 A1* | 7/2010 | Kazi et al. | 60/274 |
| 2010/0212293 A1* | 8/2010 | Deeba et al. | 60/274 |
| 2010/0221161 A1 | 9/2010 | Schneider et al. | |
| 2010/0290964 A1* | 11/2010 | Southward | B01D 53/9468 423/213.5 |
| 2011/0214412 A1* | 9/2011 | Chiffey et al. | 60/274 |
| 2011/0305615 A1* | 12/2011 | Hilgendorff | 423/213.5 |
| 2015/0226100 A1 | 8/2015 | Bandl-Konrad et al. | |

FOREIGN PATENT DOCUMENTS

| | | |
|---|---|---|
| EP | 1536111 | 6/2005 |
| EP | 1772184 | 4/2007 |
| EP | 1 837 076 A1 | 9/2007 |
| EP | 1837076 A1 | 9/2007 |
| GB | 2406803 A | 4/2005 |
| JP | 2001-140632 | 5/2001 |
| JP | 2001140632 A | 5/2001 |
| JP | 2007-285295 A | 11/2007 |
| WO | 9947260 | 9/1999 |
| WO | 2001012320 A1 | 2/2001 |
| WO | WO-2004/076829 A1 | 9/2004 |
| WO | 2008047170 | 4/2008 |
| WO | 2008075111 | 6/2008 |
| WO | 2008075111 A1 | 6/2008 |
| WO | 2008070551 A3 | 7/2008 |
| WO | WO-2008/097702 A1 | 8/2008 |
| WO | WO-2009/140989 A1 | 11/2009 |
| WO | 2010118125 A2 | 10/2010 |
| WO | 2011080525 | 7/2011 |

OTHER PUBLICATIONS

British Search Report dated Jun. 16, 2010, from British Patent Application No. 1003781.0.

British Search Report dated Jul. 6, 2011, from British Patent Application No. 1103826.2.

International Search Report dated Jul. 8, 2011, from PCT International Application No. PCT/GB2011/050443.

* cited by examiner

EXHAUST SYSTEM COMPRISING $NO_x$ STORAGE CATALYST AND CSF

FIELD OF THE INVENTION

The present invention relates to an exhaust gas aftertreatment system for a diesel-engined vehicle, which system comprising a $NO_x$ Storage Catalyst (NSC) followed in a downstream direction by a Catalysed Soot Filter (CSF).

BACKGROUND OF THE INVENTION

Diesel engines are known for certain advantages including low fuel consumption, high torque and low carbon monoxide (CO) and carbon dioxide ($CO_2$) emissions. However, whilst diesel engines tend to produce lower amounts of regulated emissions than gasoline engines, they are also associated with some more difficult to manage emissions, particularly nitrogen oxides ($NO_x$, essentially NO and $NO_2$) and particulate matter (PM). The other regulated pollutant from internal combustion engines is non-combusted or unburnt (including partially burnt) hydrocarbons (HC).

There are primarily two methods of reducing emissions from engines, the first being engine design and management, and the second being aftertreatment of the exhaust gases. Exhaust gas aftertreatment has evolved considerably by research and development of catalytic methods of treating the regulated emissions, and when used with electronic engine management is generally successful in meeting current emission standards. Nonetheless, ever increasing emission regulations, combined with pressure to reduce fuel consumption and associated $CO_2$ emissions from environmental and global warming perspectives, continue to present challenges to the design of engines and aftertreatment systems.

Historically, the first catalytic aftertreatment introduced for vehicular diesel engines was a Diesel Oxidation Catalyst (DOC) comprising a Platinum Group Metal catalyst, normally platinum, deposited on a flow-through ceramic or metal honeycomb substrate. Such DOCs are effective to oxidise CO and HC, and are now widely used. Additionally, such DOCs can be effective to reduce the mass of PM by simultaneously oxidising volatile organic fractions (of hydrocarbons) absorbed on a carbonaceous particle.

The use of in-line $NO_x$ storage catalysts (NSC), often called Lean $NO_x$ Traps or $NO_x$ absorber catalysts (NAC), is now well known in exhaust gas aftertreatment systems for lean burn internal combustion engines. Possibly the earliest patent publication is Toyota's EP 0 560 991, which describes how a $NO_x$ storage unit may be constructed by incorporating materials such as barium oxide which react with $NO_x$ to form nitrates, and a $NO_x$ conversion catalyst such as platinum. The NSC is periodically regenerated by modulating the fuel/air ratio (commonly called "lambda" or $\lambda$) to stoichiometric ($\lambda=1$) or rich ($\lambda<1$). During rich excursions, engine management provides high concentrations of HC, to purge the NSC of stored $NO_x$. The $NO_x$ released is simultaneously reduced by contact with the catalyst to nitrogen gas. A rich purge event may also be termed a NSC regeneration event.

The removal of PM from diesel exhaust gases is generally realised by some form of filter or partial filter. A large number of filter designs have been proposed in the patent literature. Currently, the state of the art filter is a ceramic or ceramic-like wall flow filter, carrying a PM combustion catalyst, known as a catalysed soot filter (CSF). A number of variations on CSFs have been proposed, including the coating of the filter with a $NO_x$ storage catalyst. State of the art CSFs carry a DOC-type coating zone at the front of the filter and a lower-loaded zone on the rear of the filter. Generally, both zones are Pt-based.

A design of aftertreatment system for diesel-engined vehicles has been proposed which comprises a NSC followed by a CSF. Such design is illustrated in our WO 2008/075111, the contents of which, together with the references therein, are incorporated herein. However, it has proved difficult to meet the upcoming emission regulations of EU6 and US Tier 2 Bin 5, in a relatively simple and relatively inexpensive system.

EP 1536111 discloses an apparatus and a method for the removal of methane, $CH_4$, and nitrous oxide, $N_2O$, from the exhaust gases during operation of a combustion engine, particularly during rich operation of the engine, wherein the apparatus comprises means for parameter tuning of the engine, a $NO_x$ reduction catalyst including means for $NO_x$ reduction and catalysts for reducing methane and nitrous oxide in the exhaust gases of the engine. In a preferred embodiment, a Nitrogen Storing Reduction type catalyst comprising palladium and ceria or zirconia components as oxygen storage components on a particle filter is used, wherein the palladium is for reducing methane.

SUMMARY OF THE INVENTION

The present inventors have noticed that one of the difficulties in exhaust gas aftertreatment for modern light duty diesel engines arises from the low exhaust gas temperatures, particularly downstream of the turbocharger, which extracts energy from the exhaust gas stream, and consequently reduces the gas temperature further, which causes difficulty with catalyst light-off. They have also noticed that such low temperatures exacerbate the difficulty of oxidising total HC over the CSF, particularly since a proportion of the HC generated for NSC regeneration is methane, and methane forms a high proportion of the HC leaving the NSC during regeneration.

Methane is difficult to oxidise over a NSC and over a CSF under normal operating conditions, because of its high light-off temperature. For a conventional CSF, having a Pt catalyst on the channels, light-off, defined as the temperature at which 50% by concentration, of the methane is reacted, is in the region of 400° C. Light duty diesel engines do not normally generate such temperatures in the CSF. The exhaust gas temperature from a light duty diesel vehicle only reaches this region during high speed or high load driving conditions. There thus remains a need for the control of total HC in systems of the NSC and CSF type. For the avoidance of doubt, NSC as used herein does not include devices known as passive $NO_x$ absorbers: we refer for example to WO 2008/047170 as an illustration of such a passive $NO_x$ absorber.

Accordingly, the present invention provides an exhaust gas aftertreatment system for a diesel-engined vehicle, which system comprising a $NO_x$ Storage Catalyst (NSC) followed in a downstream direction by a Catalysed Soot Filter (CSF), wherein the CSF comprises an oxidative catalyst comprising a palladium-rich weight ratio of platinum and palladium. The skilled person will understand that the DOC-type coating on a conventional CSF will not oxidise a significant quantity of methane under the conditions of a NSC regeneration event.

Also, the invention provides a method of aftertreating the exhaust gases from a vehicular diesel engine comprising an exhaust gas aftertreatment system comprising a $NO_x$ Storage Catalyst (NSC) followed in a downstream direction by a CSF during a NSC regeneration event, which method comprising passing the exhaust gases from the NSC during said regeneration event over an oxidative catalyst comprising a palladium-rich weight ratio of platinum and palladium.

BRIEF DESCRIPTION OF THE DRAWINGS

In order that the invention may be more fully understood, the following Example is provided by way of illustration only, with reference to the accompanying drawings, in which.

DETAILED DESCRIPTION OF THE INVENTION

Figure 1:
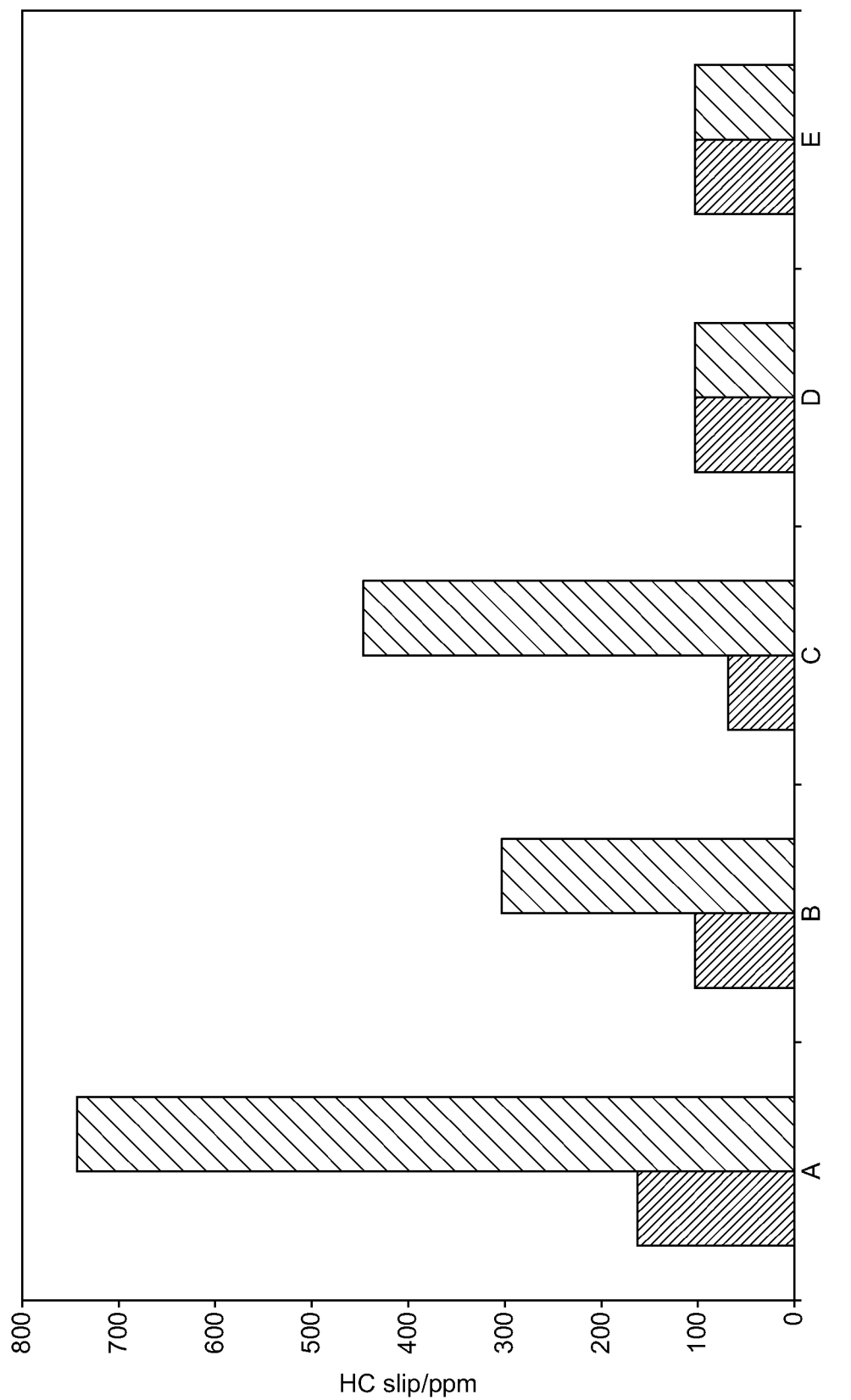
FIG. 1 is a bar chart showing total HC slip as ppm in gas leaving oxidative catalyst samples at 300° C. inlet gas temperature following 8 second and 12 second exposure to a synthetic exhaust gas regeneration event.

Desirably, the oxidative catalyst is applied to the CSF as a partial, layered or zoned coating, although a coating applied throughout the CSF, for example to all of the outlet channels, is included within the invention. In the case of a zoned coating, it is desirable that the remainder of the coating is a conventional CSF catalyst capable of oxidising CO and HC under normal lean operating conditions, that is, not during a rich regeneration event.

In preferred embodiments, the CSF comprises a wall flow filter comprising inlet channels and outlet channels. In one embodiment, the inlet channels comprise a platinum-based oxidative catalyst and the outlet channels comprise the palladium-rich Pt:Pd oxidative catalyst.

Alternatively, the oxidative catalyst may be disposed in a downstream zone defined at a downstream end by an outlet end of the filter, wherein an inlet end of the filter comprises an upstream zone defined by an inlet end of the filter and wherein the upstream zone is a platinum-based oxidative catalyst. Such an arrangement can be used in combination with wall flow filters or any other filter arrangements.

The arrangement of a conventional Pt-based CSF catalyst disposed in an inlet zone or coated on inlet channels of a wall flow filter upstream of the Pd-rich catalyst disposed in a zone or coated on outlet channels is advantageous in that it provides better thermal management and therefore increases the efficiency of the exhaust gas aftertreatment system. In particular, a rich regeneration event generates increased exhaust gas temperature. Accordingly, the location of the Pd-rich catalyst is not temperature limited, because the filter as a whole is contacted with exhaust gas at increased temperature. However, exhaust gas temperature during normal lean engine operation, i.e. between regeneration events, is cooler and so the activity of the Pt-based catalyst is temperature limited. Hence, it is preferred to dispose the Pt-based catalyst in a location where it can achieve carbon monoxide and hydrocarbon light-off as soon after cold start as possible and for treating exhaust gases emitted from high speed driving, e.g. the EUDC part of the MVEG-B drive cycle.

In embodiments wherein the filter features a platinum-based oxidative catalyst, in preferred embodiments the platinum-based oxidative catalyst comprises palladium in a platinum-rich Pt:Pd weight ratio.

The application of coatings to wall-flow filters and other filter substrates to achieve partial, layered or zoned coating may be achieved by methods known to the person skilled in the art, see for example our WO 99/47260 or our International patent application no. PCT/GB2011/050005 filed Jan. 4, 2011.

The oxidative catalyst desirably comprises a Pt/Pd composition. A conventional CSF oxidative catalyst is based on Pt, but we have found that Pd is the best catalyst for oxidising methane. On the other hand, Pd-only catalysts are very susceptible to poisoning by the sulphur present in all diesel fuels, even ultra low sulphur fuels. A Pd-rich Pt:Pd weight ratio of down to approximately 1:10 is presently believed to be most effective in the present invention. The loading of active catalyst components may need to be established according to the specific engine and associated engine management, and will also vary according to the size and the number of cells per unit area of the filter substrate.

The catalyst composition deposited generally comprises a washcoat component, as is conventional. We believe that the oxidation of methane is highly dependent on the air:fuel ratio, and that the conditions during a rich regeneration event do not assist the oxidation of methane. Accordingly, it is preferred to incorporate a relatively high amount of Oxygen Storage Component (OSC) component in the washcoat composition. The best-known OSC is ceria, often used in the form of ceria/zirconia mixed oxide. For example, suitable OSC component loadings for use in the present invention are 20-50% by weight. This compares to an OSC component loading in the conventional catalyst applied to a CSF of 0-15 wt %. It should be understood that this loading refers to the loading of OSC component, and if that is ceria/zirconia 50:50, the quantity of ceria will accordingly be halved.

Desirably, the engine used in the present invention is of the common rail injector type, rather than a unit injector type (PD-type). Our initial tests indicate that unit injector engines can generate very high methane levels indeed (up to 90% methane in total HC) during a NSC regeneration. Nonetheless, it is believed that the present invention also offers the possibility of improvements in HC emissions with unit injector engines.

EXAMPLES

To model CSFs, 1 inch×3 inch (2.5 cm×7.5 cm) ceramic flow-through substrates (not filter substrates) had 1.0 gin$^{-3}$ of a variety of catalyst compositions, deposited using conventional technology. The samples were exposed to flowing gases in a synthetic catalytic activity test (SCAT) apparatus, to model lean conditions followed by a short (8 sec or 12 sec) rich excursion to represent regeneration.

The catalyst compositions were all deposited at 60 gft$^{-3}$ onto different washcoats which were deposited at 1 gin$^{-3}$:

Sample A: 2:1 Pt:Pd on an alumina washcoat (not according to the invention);
Sample B: 1:2 Pt:Pd on an alumina washcoat;
Sample C: 1:10 Pt:Pd on an alumina washcoat;
Sample D: 1:2 Pt:Pd on a 50:50 alumina:ceria/zirconia mixed oxide washcoat; and
Sample E: 1:10 Pt:Pd on a 50:50 alumina:ceria/zirconia mixed oxide washcoat.

Lean condition gas composition was: 8% $CO_2$, 12% $O_2$ and 5% $H_2O$.

Rich condition gas composition was: 8% $CO_2$, 0.5% $O_2$, 5% $H_2O$, 100 ppm NO, 500 ppm CO, 1000 ppm Cl methane and an equal amount of propene when measured as Cl carbon species.

The SCAT apparatus was stabilised at inlet gas temperatures of 300° C. (equivalent to a light-duty diesel passenger vehicle fitted with a CSF in an underfloor location at fast motorway driving speeds) and 350° C. under lean conditions before either an 8 sec or 12 sec rich excursion (shown as black or grey bars respectively in the Figures). The total HC slip was measured as ppm in the gas leaving the samples, and the results are shown in FIG. 1 (at 300° C.) and FIG. 2 (at 350° C.).

Examining the results, especially comparing Sample E with sample C in FIG. 1, it can be seen that the presence of ceria in Sample E slips significantly less HC during the rich regeneration, noticeably during the longer rich purge.

FIG. 1 also demonstrates that the presence of ceria plays a useful role in the longer rich excursions, and no difference can be seen in HC slippage between 8 sec and 12 sec purges.

Figure 2:
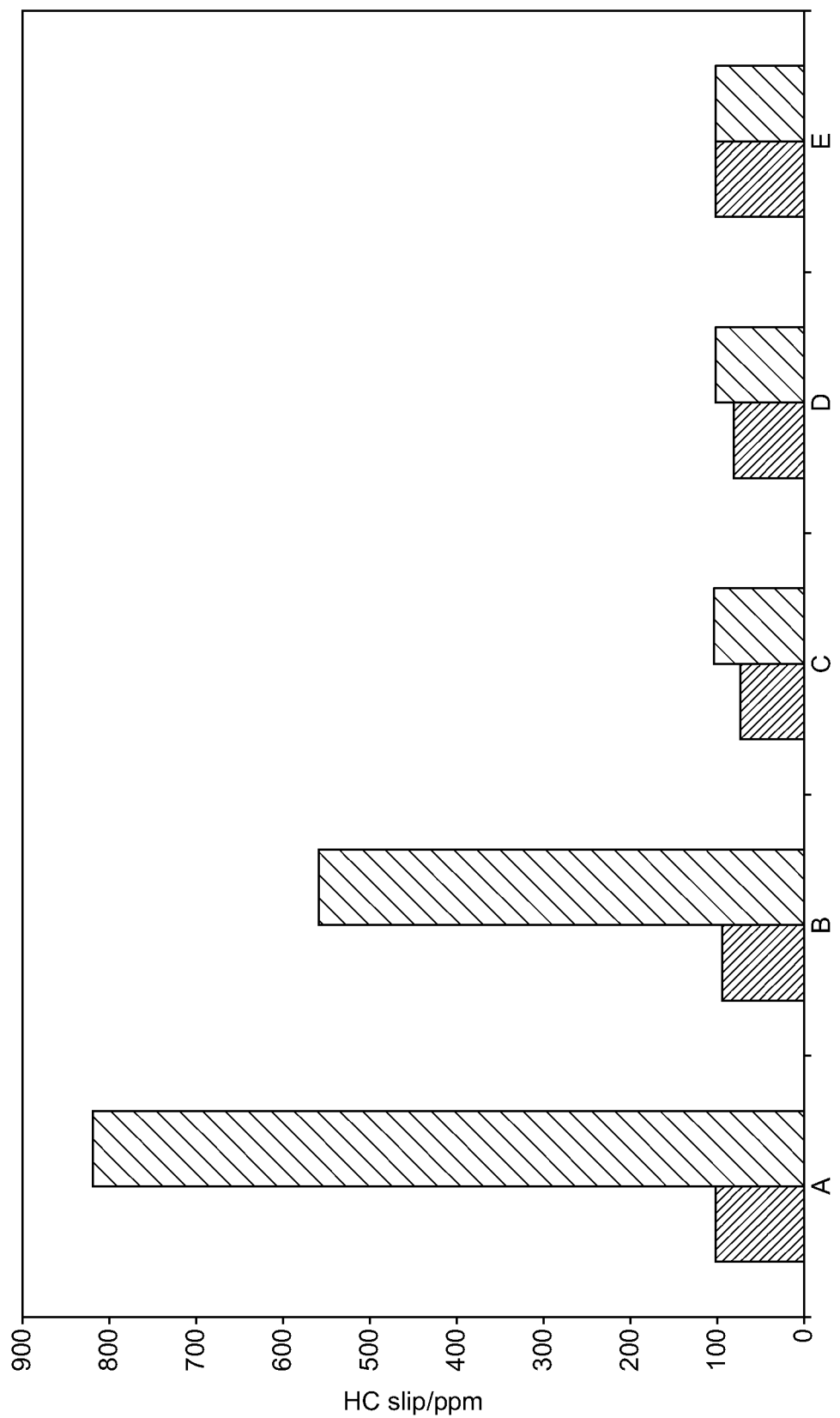
FIG. 2 is a bar chart showing the results for the same oxidative catalyst samples at 350° C. inlet gas temperature.

At 350° C., it can easily be seen from FIG. 2 that samples containing more Pd than Pt, and OSC, convert most of the HC.

What is claimed:

1. An exhaust gas aftertreatment system for a diesel engine, the system comprising a NOx Storage Catalyst (NSC) followed in a downstream direction by a Catalyzed Soot Filter (CSF), wherein the CSF comprises a palladium rich oxidative catalyst composition comprising: (1) a palladium-rich platinum:palladium catalyst where the ratio of platinum:palladium is based on weight, (2) an oxygen storage component in an amount of 20-50 weight %, and (3) a washcoat component, where the oxygen storage component is present in a washcoat with the palladium-rich platinum:palladium catalyst and the washcoat component, and wherein the CSF comprises a wall flow filter comprising inlet channels and outlet channels, wherein the inlet channels comprise a platinum-based oxidative catalyst and the outlet channels comprise the palladium-rich oxidative catalyst composition.

2. The system according to claim 1, wherein the Pt:Pd weight ratio in the palladium rich oxidative catalyst composition is less than 1:2.

3. The system system according to claim 2, wherein the Pt:Pd weight ratio in the palladium rich oxidative catalyst composition is less than 1:10.

4. The system according to claim 1, wherein the oxygen storage component comprises ceria or a ceria-zirconia mixed oxide.

5. The system according to claim 1, wherein the platinum-based oxidative catalyst comprises palladium in a platinum-rich Pt:Pd weight ratio.

6. A vehicle comprising a diesel engine and an exhaust system according to claim 1.

7. A method of aftertreating the exhaust gases from a vehicular diesel engine during a NSC regeneration event, the method comprising passing the exhaust gases through an exhaust gas aftertreatment system of claim 1.

8. The method according to claim 7, wherein the method reduces total hydrocarbons in the exhaust gas.

9. The method according to claim 8, wherein the oxidative catalyst composition oxidises 20 to 90% by volume of methane present in the exhaust gases entering the CSF during the NSC regeneration event.

10. The method according to claim 7, wherein the oxidative catalyst composition oxidises 20 to 90% by volume of methane present in the exhaust gases entering the CSF during the NSC regeneration event.

\* \* \* \* \*